(12) United States Patent
Akashi et al.

(10) Patent No.: US 10,027,200 B2
(45) Date of Patent: Jul. 17, 2018

(54) ROTOR INCLUDING BALANCER WEIGHT AND MOTOR

(71) Applicant: FANUC CORPORATION, Yamanashi (JP)

(72) Inventors: Koudai Akashi, Yamanashi (JP); Yasuo Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 285 days.

(21) Appl. No.: 14/872,350

(22) Filed: Oct. 1, 2015

(65) Prior Publication Data

US 2016/0099629 A1 Apr. 7, 2016

(30) Foreign Application Priority Data

Oct. 2, 2014 (JP) .................................. 2014-204236

(51) Int. Cl.
    *H02K 7/04* (2006.01)
    *H02K 1/27* (2006.01)
    *H02K 1/30* (2006.01)

(52) U.S. Cl.
    CPC .............. *H02K 7/04* (2013.01); *H02K 1/2773* (2013.01); *H02K 1/30* (2013.01)

(58) Field of Classification Search
    CPC .......... H02K 7/04; H02K 1/2773; H02K 1/30; H02K 1/27; H02K 1/276; H02K 1/28
    USPC ...................... 310/156.11, 216.117
    See application file for complete search history.

(56) References Cited

U.S. PATENT DOCUMENTS

| 3,826,940 | A | * | 7/1974 | McKean | H02K 17/165 310/211 |
|---|---|---|---|---|---|
| 5,512,792 | A | * | 4/1996 | Bawin | H02K 1/28 310/211 |
| 6,741,010 | B2 | * | 5/2004 | Wilkin | H02K 1/27 310/156.02 |
| 9,712,020 | B2 | * | 7/2017 | Lange | H02K 9/06 |
| 2004/0174086 | A1 | * | 9/2004 | White | H02K 1/06 310/216.004 |

(Continued)

FOREIGN PATENT DOCUMENTS

| JP | S47-13011 A | 2/1972 |
|---|---|---|
| JP | S58162771 U | 10/1983 |

(Continued)

OTHER PUBLICATIONS

Concise Explanation of Japanese Publication No. S47-13011, published Feb. 4, 1972, 1 page.

(Continued)

*Primary Examiner* — Naishadh Desai
(74) *Attorney, Agent, or Firm* — Fredrikson & Byron, P.A.

(57) ABSTRACT

A rotor capable of fixing a balancer weight by an easier method. The rotor includes a shaft; a core having a core hole penetrating the core in an axial direction; a rod configured to be inserted into the core hole so as to protrude from one end surface of the core in the axial direction to the one side in the axial direction; a balancer weight having a weight hole and placed on the end surface with the rod inserted into the weight hole; and a fixing member having a fixing hole and coming into contact with the balancer weight from the one side in the axial direction with the rod inserted into the fixing hole to fix the balancer weight by sandwiching the balancer weight with the end surface.

5 Claims, 5 Drawing Sheets

(56) References Cited

U.S. PATENT DOCUMENTS

2012/0098359 A1* 4/2012 Morozumi .............. H02K 7/04
                                                    310/51
2014/0175930 A1* 6/2014 Adaniya ................ H02K 1/276
                                                    310/156.11

FOREIGN PATENT DOCUMENTS

| JP | S61032771 U | 2/1986 |
| JP | 2118450 U | 9/1990 |
| JP | 2246748 A | 10/1990 |
| JP | H42960 U | 1/1992 |
| JP | 79583 Y2 | 3/1995 |
| JP | 2001218411 A | 8/2001 |
| JP | 2003319624 A | 11/2003 |
| WO | 2014033016 A2 | 3/2014 |

OTHER PUBLICATIONS

English Abstract and Machine Translation for WO Publication No. 20141033016 A2, published Mar. 6, 2014, 7 pgs.
Untranslated Decision to Grant a Patent mailed by Japan Patent Office (JPC)) for Application No. JP 2014-204236, dated Mar. 7, 2017, 3 pages.
English machine translation of Decision to Grant a Patent mailed by Japan Patent Office (JPO) for Application No. JP 2014-204236, dated Mar. 7, 2017, 3 pages.
Untranslated Notification of Reasons for Refusal mailed by Japan Patent Office (JPO) for Application No. JP 2014-204236, dated Oct. 11, 2016, 4 pages.
English machine translation of Notification of Reasons for Refusal mailed by Japan Patent Office (JPO) for Application No. JP 2014-204236, dated Oct. 11, 2016, 4 pages.
Untranslated Notification of Reasons for Refusal mailed by Japan Patent Office (JPO) for Application No. JP 2014-204236, dated Jun. 7, 2016, 3 pages.
English machine translation of Notification of Reasons for Refusal mailed by Japan Patent Office (JPO) for Application No. JP 2014-204236, dated Jun. 7, 2016, 3 pages.
Untranslated Notification of Reasons for Refusal mailed by Japan Patent Office (JPO) for Application No. JP 2014-204236, dated Jan. 12, 2016, 3 pages.
English machine translation of Notification of Reasons for Refusal mailed by Japan Patent Office (JPO) for Application No. JP 2014-204236, dated Jan. 12, 2016, 3 pages.
English Abstract for Japanese Publication No. 02-246748 A, published Oct. 2, 1990, 1 pg.
English Abstract and Machine Translation for Japanese Publication No. 2003-319624 A, published Nov. 7, 2003, 11 pgs.
English Abstract for Japanese Publication No. H02-118450 U, published Sep. 21, 1990, 2 pgs.
English Machine Translation for Japanese Publication No. 07-009583 A, published Mar. 6, 1995, 5 pgs.
English Machine Translation for Japanese Publication No. JPS58-162771 U, published Oct. 29, 1983, 4 pgs.
English Machine Translation for Japanese Publication No. JPH04-002960 U, published Jan. 10, 1992, 4 pgs.
English Machine Translation for Japanese Publication No. JPS61-032771 U, published Feb. 27, 1986, 5 pgs.
English Abstract and Machine Translation for Japanese Publication No. JP 2001-218411 A, published Aug. 10, 2001, 10 pgs.

\* cited by examiner

ROTOR INCLUDING BALANCER WEIGHT AND MOTOR

BACKGROUND OF THE INVENTION

1. Field of the Invention

The invention relates to a rotor including a balancer weight for adjusting the rotational balance, and a motor.

2. Description of the Related Art

In a rotor of a motor, a technique of providing a balancer weight for adjusting rotational balance during operation is known (for example, Japanese Laid-open Patent Publication No. H2-246748, Japanese Laid-open Patent Publication No. 2003-319624, Japanese Unexamined Utility Model Application Publication No. H2-118450, and Japanese Examined Utility Model Application Publication No. H7-9583).

In order to smoothly automate manufacturing steps of a rotor, a technique capable of fixing a balancer weight to the rotor by an easier method is required.

SUMMARY OF THE INVENTION

In one aspect of the invention, a rotor of a motor comprises a shaft; a core fixed on radially outside of the shaft, and including a core hole extending through the core in an axial direction; and a rod inserted into the core hole so as to protrude from an end surface of the core at one side in the axial direction toward the one side in the axial direction.

In addition, the rotor comprises a balancer weight including a weight hole into which the rod is inserted, and placed on the end surface while the rod is inserted into the weight hole; and a fixing member including a fixing hole into which the rod is inserted, and contacting the balancer weight from the one side in the axial direction while the rod is inserted into the fixing hole, whereby holding the balancer weight between the fixing member and the end surface so as to fix the balancer weight.

The balancer weight and the fixing member may be annular. The fixing member may include a spring part arranged around the fixing hole and defining the fixing hole. The spring part may be elastically deformed to expand by the rod when the rod is inserted into the fixing hole, and tighten the rod by the action of an elastic restoring force generated in the spring part.

A slit, which extends from an inner edge of the spring part which defines the fixing hole toward an outer edge of the fixing member, may be formed at the spring part. In another aspect of the invention, a motor comprises the above-described rotor.

BRIEF DESCRIPTION OF THE DRAWINGS

The above-described and other objects, features, and advantages of the invention will be clarified by describing the following preferred embodiment with reference to the attached drawings, in which.

DETAILED DESCRIPTION

Figure 1:
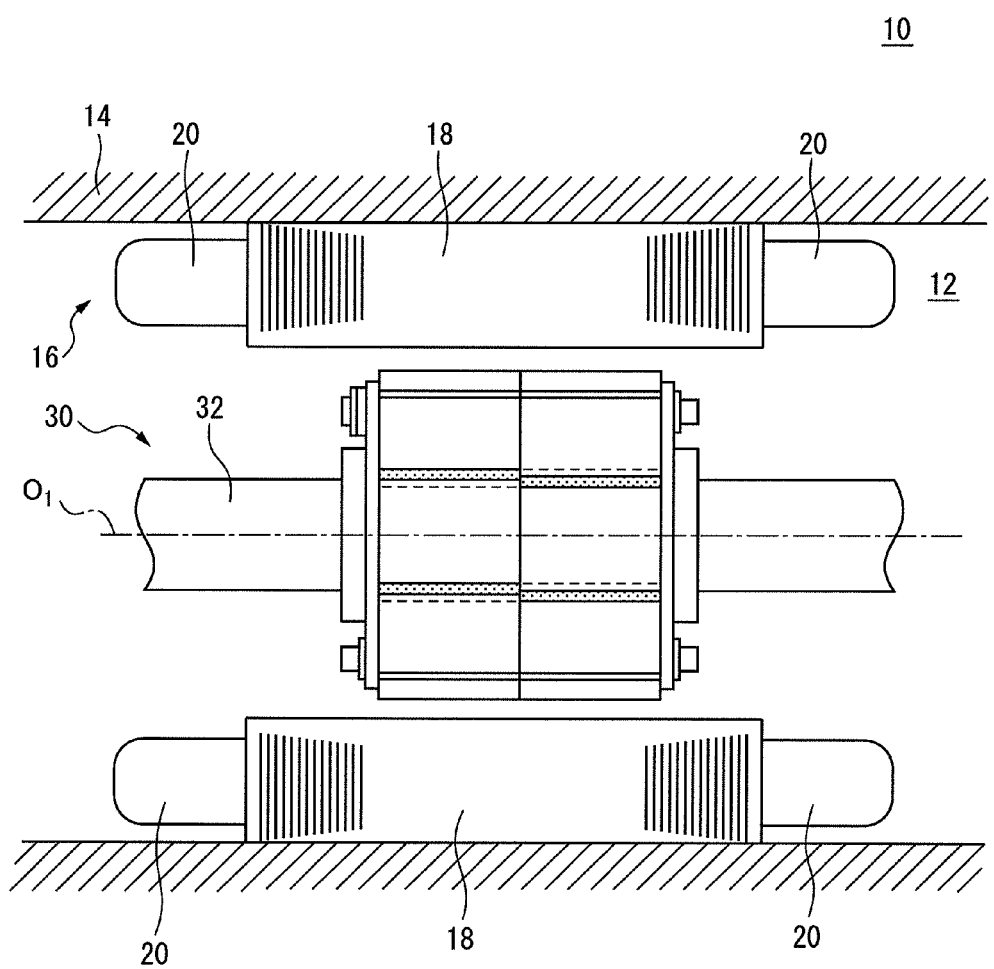
FIG. 1 is a side view of a motor according to an embodiment of the invention.

Hereinafter, an embodiment of the invention will be described in detail based on the drawings. First, referring to FIG. 1, a motor 10 according to an embodiment of the invention will be described. Note that, in the following description, an axial direction indicates a direction along a rotation axis $O_1$ of a shaft 32 shown in FIG. 1, a radial direction indicates a radial direction of a circle centered about the axis $O_1$, and a circumferential direction indicates a circumferential direction of the circle centered about the axis $O_1$. In addition, the frontward in the axial direction (axially frontward) corresponds to the leftward in FIG. 1.

The motor 10 includes a housing 14 defining an inner space 12; a stator 16 fixed in the inner space 12 of the housing 14; and a rotor 30 rotatably arranged at radially inside of the stator 16. The stator 16 includes a stator core 18 and a coil 20 wound around the stator core 18.

Figure 2:
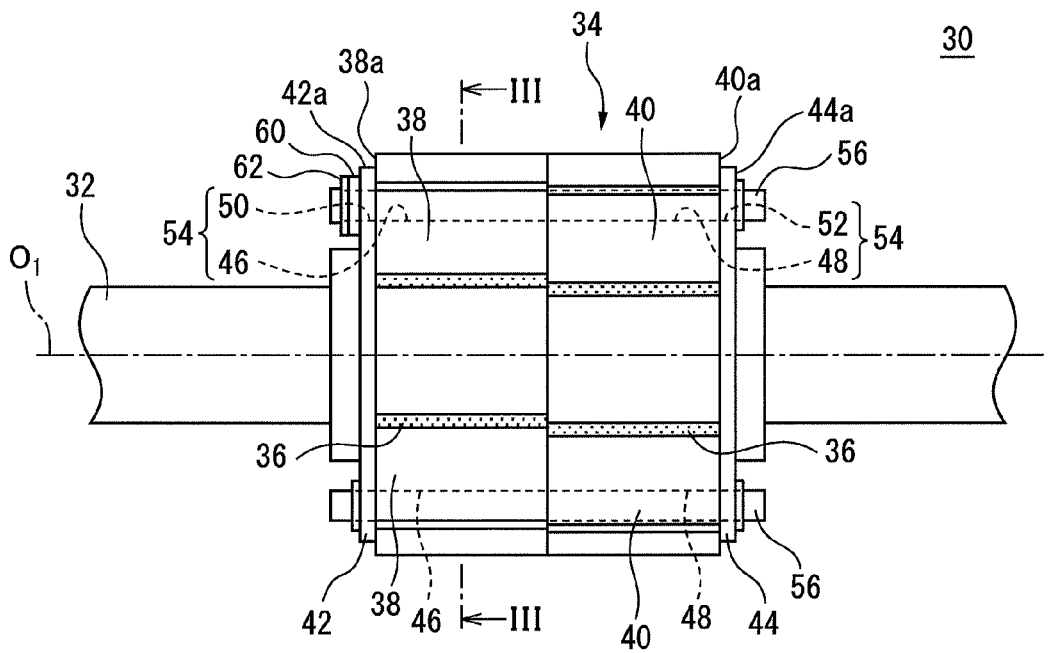
FIG. 2 is a side view of the rotor shown in FIG. 1.
Figure 3:
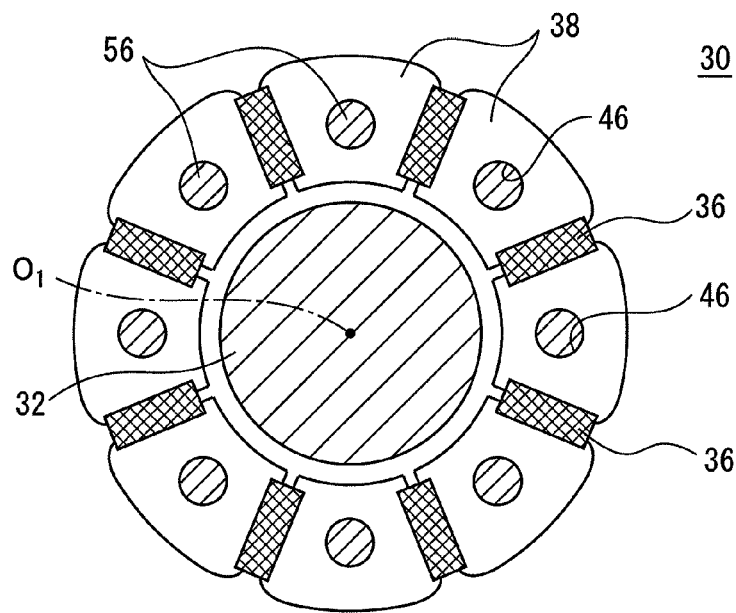
FIG. 3 is a cross-sectional view of the rotor shown in FIG. 2 cut along III-III in FIG. 2.

Next, referring to FIG. 2 and FIG. 3, the rotor 30 according to the present embodiment will be described. The rotor 30 includes the shaft 32 extending in the axial direction; a rotor core 34 fixed on the radially outside of the shaft 32; and a plurality of magnets 36 arranged in the rotor core 34.

The rotor 30 according to the present embodiment is a so-called radial-type rotor. The rotor core 34 includes a plurality of core segments 38 arranged to align in the circumferential direction at equal intervals; and a plurality of core segments 40 arranged at axially rear side of the core segments 38 so as to align in the circumferential direction at equal intervals.

Each of the core segments 38 and 40 is configured by a plurality of magnetic steel sheets (not shown in the drawings) stacked in the axial direction. In the present embodiment, a total of eight core segments 38 and a total of eight core segments 40 are placed.

Each of the core segments 38 includes a hole 46 extending through the core segment 38 in the axial direction. Similarly, each of the core segments 40 includes a hole 48 extending through the core segment 40 in the axial direction.

The core segment 38 and the core segment 40 are positioned relative to each other so that the hole 46 and the hole 48 straightly align in the axial direction. One magnet 36 is arranged between two core segments 38 adjoining each other in the circumferential direction. Similarly, one magnet 36 is arranged between two core segments 40 adjoining each other in the circumferential direction. Therefore, in the present embodiment, a total of sixteen magnets 36 are arranged.

Each of the magnets 36 has a square pole shape having a predetermined length, height, and width. Each of the magnets 36 is positioned relative to the core segments 38 and 40 so that the length direction thereof is along the axial direction, the height direction thereof is along the radial direction, and the width direction thereof is along the circumferential direction.

The rotor core 34 further includes two end plates 42 and 44. The end plate 42 is arranged on an end surface 38a of the core segment 38 at the axially front side. On the other hand, the end plate 44 is arranged on an end surface 40a of the core segment 40 at the axially rear side.

The end plate 42 includes a total of eight holes 50 formed at positions corresponding to the holes 46 of the core segments 38. On the other hand, the end plate 44 includes a total of eight holes 52 formed at positions corresponding to the holes 48 of the core segments 40.

Thus, the hole 50 of the end plate 42, the hole 46 of the core segment 38, the hole 48 of the core segment 40, and the hole 52 of the end plate 44 align in the axial direction so as to constitute a core hole 54 which extending through the rotor core 34 in the axial direction. In this way, a total of eight core holes 54 arranged to align in the circumferential direction at equal intervals are formed in the rotor core 34.

A rod 56 extending in the axial direction is inserted into each of the core holes 54. In the present embodiment, as shown in FIG. 3, a total of eight substantially cylindrical rods 56 are arranged. Each of the rods 56 is arranged so as to protrude from an axially front end surface 42a of the end plate 42 to axially frontward and to protrude from an axially rear end surface 44a of the end plate 44 to axially rearward.

Here, the rotor 30 according to the present embodiment further includes at least one balancer weight 60 and at least one fixing member 62 for fixing the balancer weight 60. Next, referring to FIG. 4 to FIG. 7, the balancer weight 60 and the fixing member 62 according to the present embodiment will be described.

Figure 4:
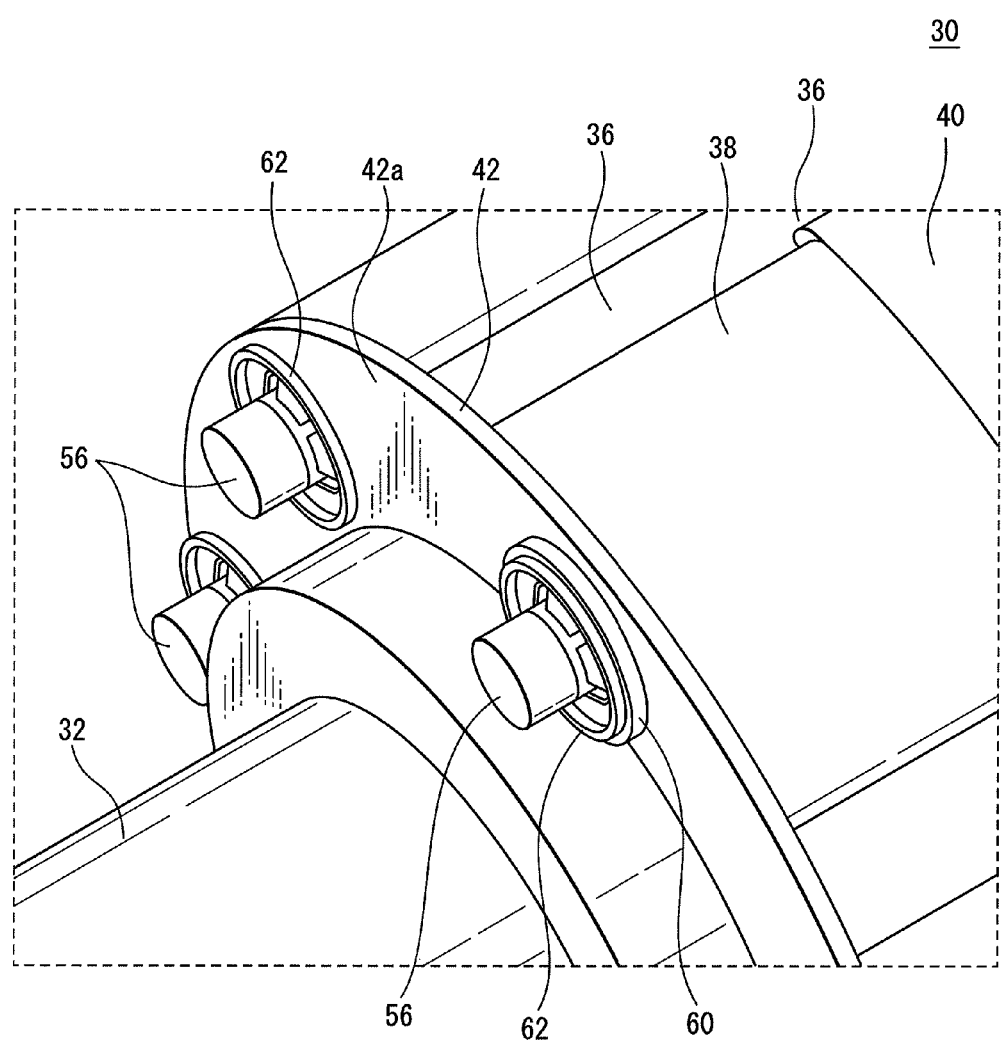
FIG. 4 is a perspective view of the rotor shown in FIG. 2 seen from the axially front side.
Figure 5:
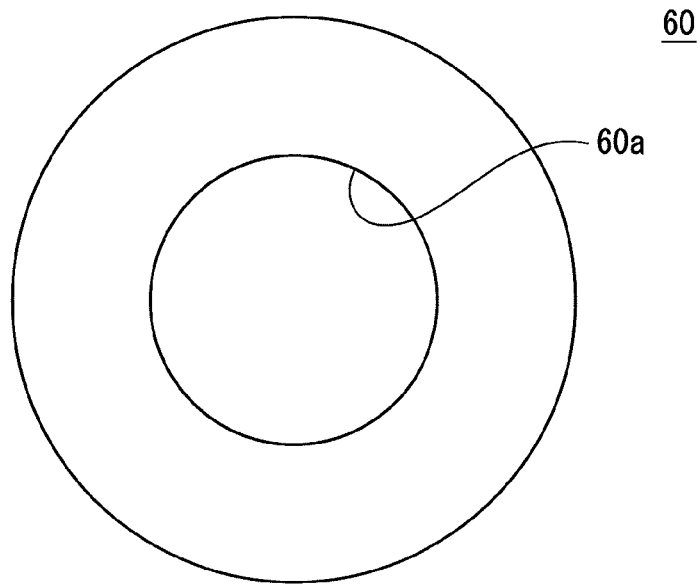
FIG. 5 is a front view of the balancer weight shown in FIG. 4.

In FIG. 4, the balancer weight 60 and the fixing member 62 are attached to one rod 56, while only the fixing members 62 are attached to the other two rods 56. As shown in FIG. 5, the balancer weight 60 is an annular member having a weight hole 60a. The balancer weight 60 is a member for adjusting the rotational balance of the rotor 30 when the rotor 30 rotates, and has a predetermined weight.

Figure 6:
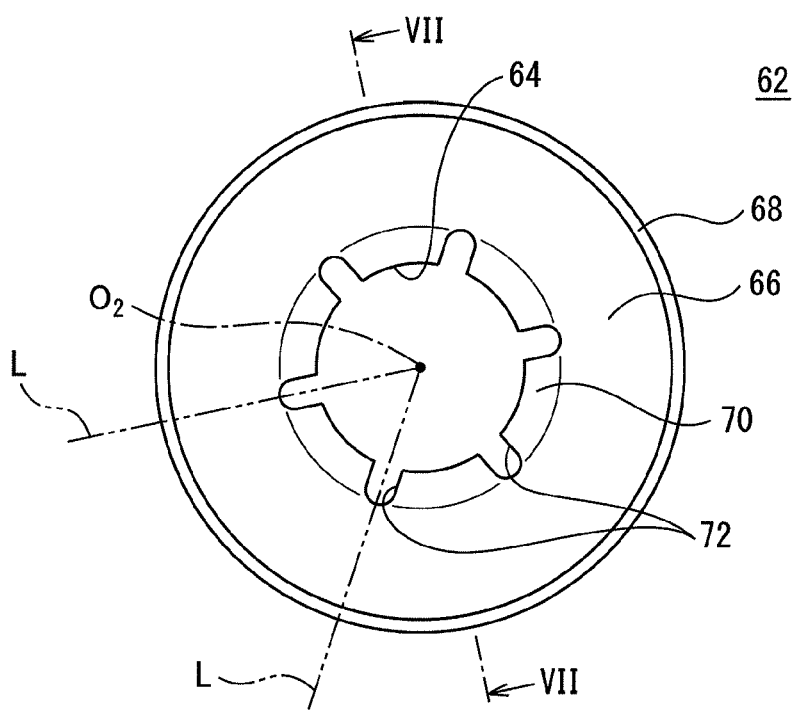
FIG. 6 is a front view of the fixing member shown in FIG. 4.
Figure 7:
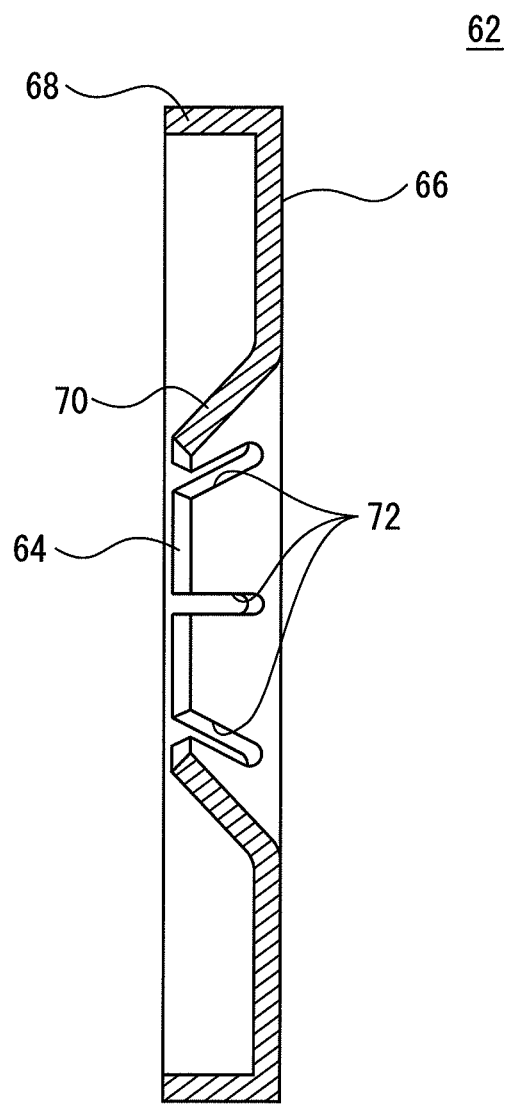
FIG. 7 is a cross-sectional view of the fixing member shown in FIG. 6 cut along VII-VII in FIG. 6.

As shown in FIG. 6 and FIG. 7, the fixing member 62 is an annular member having a fixing hole 64. More specifically, the fixing member 62 includes an annular flat plate part 66; a cylindrical outer plate part 68 extending from the outer peripheral edge of the flat plate part 66 to axially frontward; and a truncated cone-shaped spring plate part 70 extending from the inner peripheral edge of the flat plate part 66 to axially frontward so as to be slanted relative to the flat plate part 66.

The fixing hole 64 of the fixing member 62 is surrounded by the spring plate part 70, and defined by the inner edge of the spring plate part 70. A plurality of slits 72 are formed at the spring plate part 70. Each of the slits 72 is formed at the spring plate part 70 so as to extend from the inner edge of the spring plate part 70 (i.e., the fixing hole 64) toward the outer plate part 68 along a virtual line L radially extending from a central axis $O_2$ of the fixing member 62.

Referring to FIG. 4 again, the balancer weight 60 is arranged so as to contact the end surface 42a of the end plate 42 while the rod 56 is inserted into the weight hole 60a. On the other hand, the fixing member 62 is arranged so as to contact the balancer weight 60 from axially front side while the rod 56 is inserted into the fixing hole 64.

Here, the inner diameter of the fixing hole 64 of the fixing member 62 is set to be smaller than the outer diameter of the rod 56. Therefore, the spring plate part 70 is elastically deformed to expand by the rod 56 when the rod 56 is inserted into the fixing hole 64 of the fixing member 62, whereby the diameter of the inner edge of the spring plate part 70, i.e., the fixing hole 64, is enlarged.

Then, the rod 56 is tightened by the inner edge of the spring plate part 70 by the action of the elastic restoring force generated in the spring plate part 70. Due to this, the movement of the fixing member 62 relative to the rod 56 is prevented, whereby the fixing member 62 is fixed to the rod 56 by so-called interference fit.

The balancer weight 60 is held between the end surface 42a of the end plate 42 and the fixing member 62 so as to be fixed therebetween. If the balancer weight 60 is not placed and only the fixing member 62 is placed on the rod 56, the fixing member 62 is arranged to contact the end surface 42a of the end plate 42.

The number and the weight of the balancer weights 60 are appropriately set depending on parameters such as the maximum rotation frequency of the motor 10, etc. In addition, in the present embodiment, the fixing member 62 functions as a second balancer weight for adjusting the rotational balance of the rotor 30 together with the balancer weight 60. Therefore, the number and the weight of the fixing members 62 are appropriately set, depending on parameters such as the maximum rotation frequency of the motor 10, and on the number and the weight of the balancer weights 60.

Thus, according to the present embodiment, it is possible to easily attach the balancer weight 60 by sandwiching the balancer weight 60 between the fixing member 62 and the end surface 42a of the end plate 42. As a result, an attaching operation of the balancer weight 60 can be advantageously automated, so it is possible to improve the manufacturing efficiency. In addition, it is possible to reduce the number of components since any additional structure for attaching the balancer weight 60 is not required.

Note that, in the above-described embodiment, a case is described where the balancer weight 60 is arranged on the end surface 42a of the end plate 42. However, the balancer weight 60 may be arranged on the end surface 44a of the end plate 44. In this case, the fixing member 62 is arranged to contact the balancer weight 60 from axially rear side, whereby hold the balancer weight 60 between the fixing member 62 and the end surface 44a of the end plate 44 to fix the balancer weight 60.

Further, in the above-described embodiment, a case is described where the rod 56 has a cylindrical shape. However, the rod 56 may have a multangular shape, for example. In this case, the core hole 54 (i.e., the hole 50 of the end plate 42, the hole 46 of the core segment 38, the hole 48 of the core segment 40, and the hole 52 of the end plate 44) is formed to have a shape corresponding to the outer shape of the rod 56. Further, a fixing hole of a fixing member is formed to have an inner size smaller than that of the outer periphery of the rod.

In addition, in the above-described embodiment, a case is described where the rotor 30 is a so-called radial type. However, the rotor 30 may be any type of rotors. For example, a rotor may include an annular rotor core continuously extending in the circumferential direction, and a plurality of arc-shaped magnets arranged in the rotor core so as to align in the circumferential direction.

Heretofore, the invention has been described by way of the embodiment of the invention, but the above-described embodiment does not limit the invention according to claims. In addition, forms obtained by combining the features described in the embodiment of the invention can be included in the technical scope of the invention, but all of these combinations of the features are not necessarily essential for the solving means of the invention. Furthermore, it is obvious for a person skilled in the art that various modifications or improvements can be added to the above-described embodiment.

The invention claimed is:

1. A rotor of a motor comprising:
   a shaft;
   a core fixed on radially outside of the shaft, and including a plurality of core holes extending through the core in an axial direction;

a plurality of rods respectively inserted into the core holes so as to protrude from an end surface of the core at one side in the axial direction toward the one side in the axial direction;

a balancer weight including a weight hole into which a first rod of the plurality of rods is inserted, and placed on the end surface while the first rod is inserted into the weight hole;

a first fixing member including a first fixing hole into which the first rod is inserted, and contacting the balancer weight from the one side in the axial direction while the first rod is inserted into the first fixing hole, whereby holding the balancer weight between the first fixing member and the end surface so as to fix the balancer weight, wherein an inner edge of the first fixing member which defines the first fixing hole tightens the first rod so that the movement of the first fixing member relative to the first rod is prevented when the first rod is inserted into the first fixing hole; and a second fixing member including a second fixing hole into which a second rod of the plurality of rods is inserted, and contacting the end surface from the one side in the axial direction while the second rod is inserted into the second fixing hole, wherein an inner edge of the second fixing member which defines the second fixing hole tightens the second rod so that the movement of the second fixing member relative to the second rod is prevented when the second rod is inserted into the second fixing hole.

2. The rotor according to claim 1, wherein the balancer weight, the first fixing member, and the second fixing member are annular.

3. The rotor according to claim 1, wherein each of the first and second fixing members includes a spring part arranged around the fixing hole and defining the fixing hole, wherein the spring part of the first fixing member is elastically deformed to expand by the first rod when the first rod is inserted into the first fixing hole, and tightens the first rod by the action of an elastic restoring force generated in the spring part of the first fixing member, and wherein the spring part of the second fixing member is elastically deformed to expand by the second rod when the second rod is inserted into the second fixing hole, and tightens the second rod by the action of an elastic restoring force generated in the spring part of the second fixing member.

4. The rotor according to claim 3, wherein the spring part of the first fixing member is formed with a slit extending from the inner edge of the spring part of the first fixing member, which defines the first fixing hole, toward an outer edge of the first fixing member, and wherein the spring part of the second fixing member is formed with a slit extending from the inner edge of the spring part of the second fixing member, which defines the second fixing hole, toward an outer edge of the second fixing member.

5. A motor comprising the rotor according to claim 1.

* * * * *